United States Patent [19]

Rayborn

[11] Patent Number: 4,645,608

[45] Date of Patent: Feb. 24, 1987

[54] METHOD OF TREATING OIL CONTAMINATED CUTTINGS

[75] Inventor: Jerry J. Rayborn, Franklinton, La.

[73] Assignee: Sun Drilling Products, Corp., Belle Chasse, La.

[21] Appl. No.: 659,521

[22] Filed: Oct. 10, 1984

[51] Int. Cl.$^4$ .......................... C09K 7/02; B08B 7/00
[52] U.S. Cl. .................................. 252/8.51; 134/40; 175/66; 252/8.511; 252/8.510
[58] Field of Search ............. 252/8.5 R, 8.5 A, 8.5 C, 252/8.5 P; 134/40; 175/66, 58, 206

[56] References Cited

U.S. PATENT DOCUMENTS

| | | |
|---|---|---|
| 2,233,381 | 2/1941 | DeGroote et al. ................. 252/8.55 |
| 3,396,105 | 8/1968 | Burdyn et al. ........................ 252/8.5 |
| 3,688,781 | 9/1972 | Talley ............................... 175/208 X |
| 3,693,733 | 9/1972 | Teague ................................... 175/66 |
| 3,794,523 | 2/1974 | Thompson . |
| 4,040,866 | 8/1977 | Mondshine . |
| 4,097,306 | 6/1978 | Carman . |
| 4,207,193 | 6/1980 | Ford et al. . |
| 4,407,741 | 10/1983 | Maggi . |
| 4,414,128 | 11/1983 | Goffinet ............................ 134/40 X |

OTHER PUBLICATIONS

*Secondary and Tertiary Oil Recovery Processes,* Publication by Interstate Oil Compact Commission, Oklahoma City, Okla., Sep., 1974, pp. 26 and 27.

*Primary Examiner*—Herbert B. Guynn
*Attorney, Agent, or Firm*—Finnegan, Henderson, Farabow, Garrett & Dunner

[57] ABSTRACT

A method of treating oil contaminated cuttings comprising the steps of: contacting the oil contaminated cuttings with a detergent solution comprising a solvent and a surfactant selected from the group consisting of alcohol ethoxylates, phenol ethoxylates, alkylphenol ethoxylates, amine ethoxylates, thioethers, and combinations thereof so as to wash the oil from the cuttings and into the detergent solution; and separating the washed cuttings from the detergent solution containing the removed oil. The detergent solution containing the removed oil is optionally recycled back into the drilling mud.

5 Claims, No Drawings

METHOD OF TREATING OIL CONTAMINATED CUTTINGS

FIELD OF THE INVENTION

The present invention relates generally to the treatment of oil contaminated cuttings and, more particularly, to a method and a detergent composition for treating the oil contaminated cuttings present in a drilling mud.

BACKGROUND OF THE INVENTION

In the subterranean drilling of oil and gas wells, cuttings are formed in the drilling mud or fluid medium that surrounds the drill bit. The drilling mud often contains oil that coats the cuttings present in the mud so as to contaminate the cuttings. As a result, the oil contaminated cuttings are a hazardous waste, the safe use and disposal of which poses several major environmental problems.

Various washers have been proposed to address this problem. Generally, in these washers the oil contaminated cuttings are treated with a detergent solution to remove the oil from the cuttings. Although the oil is removed from the cuttings, the safe disposal of the removed oil must still be achieved. Thus, these removal methods do not result in an easy and environmentally safe means of removing and disposing of the oil from the cuttings. Furthermore, when the removed oil is disposed of as a waste product, its use is permanently lost and the process is not economically efficient.

Thus it is desirable that the oil coating be removed from the cuttings in a manner that is both environmentally safe and economically advantageous by allowing for the recycling of the removed oil back into the drilling mud. Such a process would allow for both the reclamation of clean cuttings and the reuse of the removed oil.

SUMMARY OF THE INVENTION

Accordingly, it is an object of the present invention to provide a process for the removal of oil from drill cuttings to yield clean cuttings that can be reused.

Another object of the invention is to provide a process for recycling the oil removed from oil contaminated drill cuttings back into the drilling mud.

Another object of the present invention is to provide a process for the control of the rheological properties of the drilling mud by the addition of various amounts of the recycled oil.

Yet another object of this invention is to provide a detergent composition for effectively and efficiently removing oil from oil contaminated drilling cuttings.

Additional objects and advantages of the invention will be set forth in the description that follows, and in part will be obvious from the description, or may be learned by practice of the invention. The advantages of the invention are realized and obtained by the methods and the compositions particularly pointed out in the appended claims.

To achieve these objects, the present invention provides a method of treating oil contaminated cuttings comprising the steps of: contacting the oil contaminated cuttings with a detergent solution comprising a solvent and a surfactant selected from the group consisting of alcohol ethoxylates, phenol ethoxylates, alkylphenol ethoxylates, amine ethoxylates, and combinations thereof so as to wash the oil from the cuttings and into the detergent solution; and separating the washed cuttings from the detergent solution containing the removed oil.

The present invention also provides a method of recycling oil from oil contaminated cuttings present in a drilling mud comprising the steps of: separating the oil contaminated cuttings from the drilling mud; contacting the oil contaminated cuttings with a detergent solution comprising a solvent and a surfactant selected from the group consisting of alcohol ethoxylates, phenol ethoxylates, alkylphenol ethoxylates, amine ethoxylates, thioethers, and combinations thereof so as to wash the oil from the cuttings and into the detergent solution; separating the washed cuttings from the detergent solution containing the removed oil; and adding the detergent solution containing the removed oil back into the drilling mud.

The present invention further includes a detergent composition comprising: a surfactant selected from the group consisting of alcohol ethoxylates, phenol ethoxylates, alkylphenol ethoxylates, amine ethoxylates, thioethers, and combinations thereof; and a solvent selected from the group consisting of ethers, ketones, aliphatics, aromatics, alcohols, esters, water, and mixtures thereof.

The present invention overcomes the inherent disadvantages of previous treatment processes and compositions by effectively and efficiently removing oil from the oil contaminated drill cuttings to yield clean cuttings. Unlike previous processes, the detergent solution containing the removed oil can be recycled safely back into the drilling mud to control the rheological properties of the drilling mud. The yield point and the friction coefficient of the drilling mud can be favorably lowered by the addition of this recycled oil.

Consequently, the treatment process is both economical and environmentally advantageous. The washed cuttings are not only reclaimed for other uses, but the removed oil is safely disposed of by recycling the oil back into the drilling mud.

DETAILED DESCRIPTION OF THE INVENTION

The present invention treats oil contaminated cuttings by contacting the oil contaminated cuttings with a detergent solution. The washed cuttings are then separated from the detergent solution containing the removed oil. The detergent solution comprises a solvent and a surfactant selected from the group consisting of alcohol ethoxylates, phenol ethoxylates, alkylphenol ethoxylates, amine ethoxylates, thioethers, and combinations thereof so as to wash the oil from the cuttings and into the detergent solution.

The surfactants are preferably present in the detergent solution in an amount in the range of 5 wt% to 80 wt% based on the total weight of the solution. Examples of alcohol ethoxylates are ethoxylated lauryl alcohol, ethoxylated oleyl alcohol, stearyl-cetyl alcohol, and $C_{12}$-$C_{15}$ linear primary alcohols, such as those sold under the trademark Neodol by the Shell Chemical Co. Examples of phenol ethoxylates are 30 mole phenol ethoxylate and 15–100 mole phenol ethoxylate. Acceptable alkylphenol ethoxylates include 4 mole nonylphenyl ethoxylate and 6 mole nonylphenyl ethoxylate. The amine ethoxylates can be polyoxyalkylene derivatives of ethylenediamine, such as those sold under the trademarks Tetronic 504, Tetronic 1104, and Tetronic 1504 by BASF-Wyandotte Corp. Preferably, the surfactants are in the detergent solution in the form of a sulfate or sulfonate salt.

The solvent is selected from the group consisting of ethers, ketones, aliphatics, aromatics, alcohols, esters, water, and combinations thereof. Preferably, the solvent includes water and at least one of the ethers, ketones, aliphatics, aromatics, esters, and alcohols. Acceptable ethers include 2-(2-n-butoxyethoxy)ethanol, 4-n-butoxyphenol, 1,2 dimethoxyethane, 1,2 diethoxyethane, 2-ethoxy ethanol, 2-methoxy ethanol, and esters thereof, such as 1,2 dimethoxyethane acetate and 1,2 dimethoxyethane butyrate. Also, usable are ether and ether esters of $C_2$–$C_{10}$ acids. The ketones can be one of mesityl oxide, isophorone, methylethyl ketone, ad isobutyl ketone. Examples of aliphatics include hexane, nonane, and decane. Acceptable aromatics are benzene, xylene, and toluene. Usable alcohols are $C_2$–$C_{10}$ alkanols such as butanol, isobutanol, pentanol, hexanol, heptanol, and octanol. The usable esters include $C_2$–$C_{10}$ alcohol esters, ethyl acetate, isobutyl heptoate, and octyl acetate. Preferably, the solvent is present in the detergent solution in an amount in the range of 20 wt% to 95 wt% based on the total weight of the solution.

The oil contaminated cuttings are preferably contacted with the detergent solution at a temperature within the range of 10° C. to 100° C. The time of the contact is generally between 1 minute and 6 hours. However, other temperatures and times are permitted within the scope of the invention.

The detergent solution can further include a builder to improve the cleaning efficiency of the surfactant. The builder is preferably present in the detergent solution in an amount within the range of 0.05 wt% to 4 wt%. Acceptable builders include phosphate salts, such as trisodium polyphosphate; silicate salts, such as sodium metasilicate; hydroxides, such as ammonium hydroxide; and phosphonic acids and salts. Especially useful builders are N,N'-1,2-ethanediylbis[N-(carboxymethyl)glycine] and N,N'-bis(carboxymethyl)glycine.

The cuttings are typically in the form of chips, turnings, borings, and grinding by-products. The drilling mud or drilling fluid is usually water based and often contains one or more additives or dispersants such as colloidal or non-colloidal solids, chemical dispersants, thinners, and dissolved salts. The properties of the drilling mud or fluid is affected by the types of rocks through which the subterranean well is drilled.

The oil present in the drilling mud is generally paraffin oil, diesel oil, heavy kerosene, crude oil, machine oil, and mixtures thereof. The cuttings present in the drilling mud become soaked and coated with the oil. The oil coated cuttings can neither be used nor safely disposed of without the removal of the contaminating oil from the cuttings.

In addition to removing the oil from the cuttings, the present invention also recycles the removed oil back into the drilling mud. Initially, the oil contaminated cuttings are separated from the drilling mud. The oil contaminated cuttings are then contacted with the above noted detergent solution that includes a solvent, a surfactant, and optionally a builder. The washed cuttings are then separated from the detergent solution containing the removed oil. Finally, the detergent solution containing the removed oil is added back into the drilling mud.

The addition of the detergent solution containing the removed oil to the drilling mud not only safely disposes of the oil, but also reuses the removed oil to enhance the properties of the drilling mud. Specifically, the addition of the detergent solution containing the removed oil controls the rheological properties of the drilling mud by lowering the drilling mud's yield point and friction coefficient.

The detergent solution can be prepared by various techniques in the art, such as liquid blending. Various apparatus, also known in the art, can be used to effectuate the various steps of the present process. An example of such an apparatus is a screen detergent tester.

Following is an example of the present invention, which is intended to be merely exemplary of the present invention.

EXAMPLE 1

A detergent solution having the following composition was prepared:

| Ingredient | Wt % |
| --- | --- |
| 30 mole phenol ethoxylate | 50 |
| 4 mole nonylphenol ethoxylate | 5 |
| N,N'—bis(carboxymethyl)glycine | 0.5 |
| Isobutyl alcohol | 10 |
| Water | 34.5 |

This detergent solution was then diluted with 2 to 10 parts of water. The resulting detergent solution was contacted with cuttings contaminated with oil. The oil was washed from the cuttings and into the detergent solution. The detergent solution was subsequently added to a sample of drilling mud. As a result, the yield point was reduced and the friction coefficient was decreased. The gels of the drilling mud were lowered to a greater degree than when an equivalent amount of only oil, without a detergent solution, was added to the drilling mud.

Other embodiments of the invention will be apparent to one skilled in the art from a consideration of the specification or the practice of the invention disclosed herein. It is intended that the specification and examples be considered as exemplary only, with the true scope or spirit of the invention being indicated by the claims.

What is claimed is:

1. A method of recycling oil from oil contaminated cuttings present in a drilling mud comprising the steps of:
   (a) separating the oil contaminated cuttings from the drilling mud;
   (b) contacting the oil contaminated cuttings with a detergent solution comprising $C_2$–$C_{10}$ alkanol as a solvent and an effective amount of a surfactant selected from the group consisting of alcohol ethoxylates, phenol ethoxylates, alkylphenol ethoxylates, amine ethoxylates, thioethers, and combinations thereof so as to wash the oil from the cuttings and into the detergent solution;
   (c) separating the washed cuttings from the detergent solution containing the removed oil; and
   (d) adding the detergent solution containing the removed oil back into the drilling mud.

2. The method of claim 1, wherein the surfactant is a sulfate or a sulfonate salt.

3. The method of claim 1, wherein the detergent solution further comprises a builder.

4. The method of claim 3, wherein the builder is selected from the group consisting of phosphate salts, silicate salts, hydroxides, phosphonic acids, phosphonic salts, N,N'-1,2-ethanediylbis[N-(carboxymethyl)glycine], and N,N'-bis(carboxymethyl)glycine.

5. The method of claim 1, wherein the surfactant is present in the detergent solution in an amount within the range of 5 wt% to 80 wt% based on the total weight of the solution.

* * * * *